July 21, 1959   J. A. WESTPHAL   2,896,073
APPARATUS TO AUTOMATICALLY CONTROL TRANSMITTER POWER
Filed Sept. 13, 1957

INVENTOR.
James A. Westphal
BY
Adams, Forward and McLean
ATTORNEYS

United States Patent Office 2,896,073
Patented July 21, 1959

2,896,073

APPARATUS TO AUTOMATICALLY CONTROL TRANSMITTER POWER

James A. Westphal, Owasso, Okla., assignor to Sinclair Oil & Gas Company, Tulsa, Okla., a corporation of Maine Application September 13, 1957, Serial No. 683,879

1 Claim. (Cl. 250—17)

My invention relates to control of radiant energy and in particular provides an automatic control for the output power of a radio frequency transmitter.

For certain applications of radio frequency energy in geophysical prospecting, for example, in practicing the method of geophysical exploration described in United States Patent No. 2,172,688, it is desirable to provide a radio frequency transmitter having a closely regulated power output, e.g., with maximum tolerance on the order of one part per thousand.

It is an important object of my invention, therefore, to provide an automatic output power control for a radio frequency transmitter which will provide such regulation over wide limits of variation in power supply and tube, antenna and ground characteristics.

It is also an important object of my invention to provide such regulation of the output power of a radio transmitter to hold the intensity of the radiated field within a close tolerance at any desired remote point.

These and other objects of my invention are fundamentally accomplished by sensing the antenna output power by a pickup coil or similar device located in the field of the electromagnetic wave radiated by the transmitter. The field sensing device is utilized to develop a control signal which is thus a function of the field intensity at the location of the coil or other field sensitive element, although practicably the sensing device can be positioned so close to the transmitting antenna that antenna current is sensed directly. Such control signal is then employed to control the output power of the transmitter in a manner tending to hold the field intensity constant at the location of the coil or other device.

For a more complete understanding of the principles of my invention, reference is made to the appended drawings in which.

Figure 1:
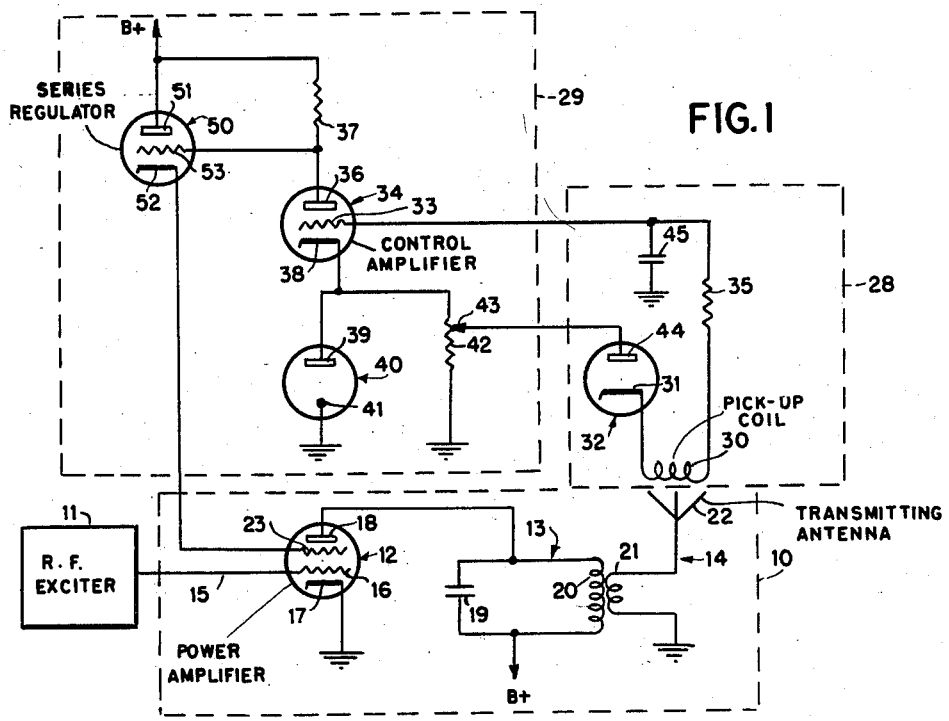
Figure 1 is a schematic drawing of an automatic output control arrangement in accordance with my invention.

Referring more particularly to Figure 1, the reference numeral 10 designates a radio frequency transmitter which is supplied with a radio frequency electrical signal from an exciter 11. Transmitter 10 includes a power amplifier tube 12, which is suitably a power tetrode, a tank circuit 13 and an antenna circuit 14.

The output signal of exciter 11, which is as nearly constant in frequency as possible, is coupled by line 15 to the control grid 16 of amplifier tube 12, the cathode 17 of which is grounded. Tank circuit 13 is in the anode 18 circuit of tube 12 which is connected to a suitable high voltage source indicated as B+. Tank circuit 13 suitably includes a parallel combination of a capacitor 19 and an inductor coil 20 which are resonant to the frequency of the output signal from exciter 11. Antenna circuit 14 is coupled by a loop inductor 21 to tank circuit 13 by locating inductor 21 adjacent to inductor 20 in the conventional manner, such that the signal developed across inductor 20 induces a signal in inductor 21 which is then radiated by antenna 22 connected in series with inductor 21 to ground.

Figure 2:
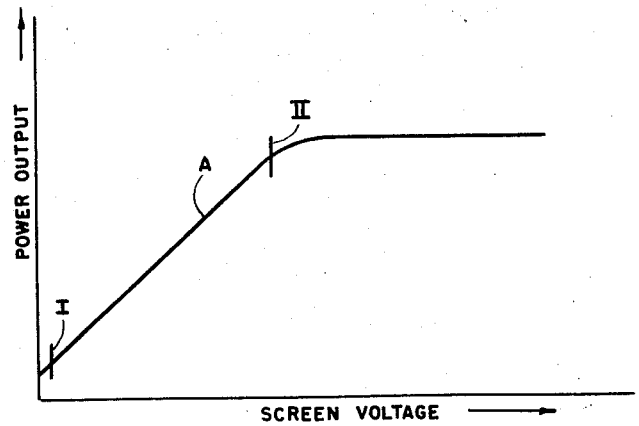
Figure 2 is a graph representing a characteristic of a portion of the circuit shown in Figure 1.

As is well known, the voltage applied at screen grid 23 of amplifier tube 12 can be utilized to control the amplification in tube 12 of a signal applied to grid 16. Figure 2 is a plot of a typical characteristic for a power tetrode showing the relationship between screen voltage, plotted as an abscissa, and the output power, plotted as an ordinate. This relationship takes the form of the curve A shown in Figure 2, assuming all other electrode potentials remain constant. It will be observed that curve A includes a linear portion in a low range of screen voltages between points I and II on curve A in which variations in screen voltage yield variations in power output. This characteristic of power tetrodes is employed in the circuit of Figure 1, therefore, to control the amplification of the signal applied to control grid 16 and hence the radiated power output of antenna 22.

To accomplish these ends, an electromagnetic field sensitive unit 28, including a pickup coil 30 is located in the field of the electromagnetic wave radiated by antenna 22, such that an electrical signal of the frequency of the radiated wave will be induced in coil 30. It is evident that the potential of the induced signal in coil 30 will be a function of the intensity of the field of the radiated wave at the location of coil 30.

Field sensitive unit 28, which also includes a diode rectifier 32 and a filter including a capacitor 45 and a resistor 35, is connected to drive a control circuit 29 for the output power of transmitter 10, as follows. Coil 30 is connected from the cathode 31 of vacuum tube diode 32 to the control grid 33 of a triode amplifier tube 34 in control circuit 29 through resistor 35. It will be further noted that the anode 36 of triode 34 in control circuit 29 is connected through a resistor 37 to the high voltage source B+, and that the cathode 38 of triode 34 is connected to the anode 39 of a gas tube voltage regulator 40, also in control circuit 29. The cold cathode 41 of regulator 40 is grounded. Thus cathode 38 is maintained at a fixed positive bias above ground. Cathode 38 of triode 34 is also connected to ground through potentiometer 42, the variable tap 43 of which is connected to the anode 44 of diode 32. Filter condenser 45 is connected between the common connection of grid 33 of triode 34 and resistor 35.

The combination of resistor 35 and capacitor 45 forms a radio frequency filter for the frequency of the signal radiated by antenna 22, and, accordingly, the induced signal in coil 30, which is rectified by diode 32, is applied as essentially direct current at grid 33 of triode 34. Potentiometer 42 is employed to adjust the static level of the control signal thus applied by field sensitive unit 28 to grid 33 in a manner which will be shown hereinafter. It will be evident, however, that increases in the amplitude of the induced signal in coil 30 will tend to make grid 33 more positive with respect to cathode 38 and thus increase the current flow through tube 34 and resistor 37, thereby decreasing the positive voltage at anode 36.

The screen potential applied to screen grid 23 of amplifier 12 by control circuit 29 is drawn from high voltage source B+ in series through a series regulator, vacuum tube triode 50, the anode 51 of which is connected to B+ and the cathode 52 of which is connected to screen grid 23. The grid 53 of triode 50 is connected to the common connection between anode 36 of triode 34 and resistor 37, such that the potential at anode 36 is applied as the control potential at grid 53. Thus the current drawn through tube 34, as determined by the value of the control signal applied at grid 33, determines the potential of grid 53 and hence the potential applied at screen 23.

In operation, pickup coil 30 is located at any convenient point in the field of the electromagnetic wave radiated by antenna 22. Potentiometer tap 43 is then adjusted to bring the potential at screen 23 of power amplifier tube 12 to a point of operation on the portion of curve A lying between points I and II. It is evident that if for some reason, such as a variation in power supply voltage of the transmitter, the output level of power radiated at antenna 22 decreases, a corresponding decrease in the signal induced in coil 30 will occur, thus decreasing, i.e., making more negative the bias applied to grid 33 of control amplifier tube 34. It will be observed that the cathode 38 potential of control amplifier tube 34, will however, remain fixed, since the cathode potential is stabilized by gas tube voltage regulator 40. Accordingly, the current flowing through tube 34 and hence through resistor 37 will decrease, thereby raising the potential at anode 36 and at grid 53. As a result of the increase in potential at grid 53 the impedance of series regulator tube 50 decreases and screen 23 current and potential increase with the result that the power output radiated by antenna 22 increases, restoring the output level of power radiated by antenna 22 to essentially its initial level. Obviously should the power output radiated by antenna 22 increase, this increase would be nullified by the reverse procedure.

In a typical insulation amplifier tube 12 is actually a pair of 6146 tetrodes connected in parallel. Series regulator tube 50 is a 6080 triode; control amplifier tube 34 ia a 6C4 triode; voltage regulator tube 40 is a 5651 tube; and diode 32 is half of a 6AL5. Pick-up coil 30 is three turns of No. 18 enameled wire wound to a 1" diameter with an air core and with the turns spaced 1 wire width apart. Coil 30 is coupled to antenna circuit 14 to sense antenna current directly by including an identical coil in series with inductor 21 and antenna 22. The two coils are positioned axially aligned and spaced apart ½ inch. Resistor 35 has 1 megohm resistance; the resistance of resistor 37 is 6.8 megohms; the capacitance of condensor 45 is 0.01 microfarad; and potentiometer 42 has a total resistance of 0.5 megohm and has a linear taper.

When grid 16 is biased at minus 75 volts, when the high voltages applied at tank circuit 13 and at anode 51 are 600 volts and 350 volts, respectively, and when potentiometer 43 is set to bias grid 33 1.5 volts negative with respect to cathode 38, 1700 kc. exciting signal from exciter 11 produces an R.F. current in antenna circuit 14 of about 1 ampere. Under these conditions screen grids 23 of the parallel 6146's (amplifier tube 12) are biased by operation of sensing unit 28 and circuit 29 at 145 volts.

The range within operating parameters can be varied without significant variation in power output is a change, as indicated before, limited to operation along curve A in Figure 2 between screen grid voltages at points I and II. Under the operating parameters described above point I represents 100 volts and point II represents 250 volts. Of course when the operating parameters are varied points I and II will shift slightly. The degree of control which can be obtained is readily seen by the fact that under the conditions described above a change in plate 18 potential of 20 volts, either negative or positive, produces an inverse change in screen 23 potential of 10 volts with no measurable variation in antenna current.

The location of field sensitive unit 28 need not be closely adjacent to antenna 22, but can be chosen at any remote point in the radiated field. A suitable arrangement for remote location of a field sensitive unit is illustrated in Figure 3.

Figure 3:
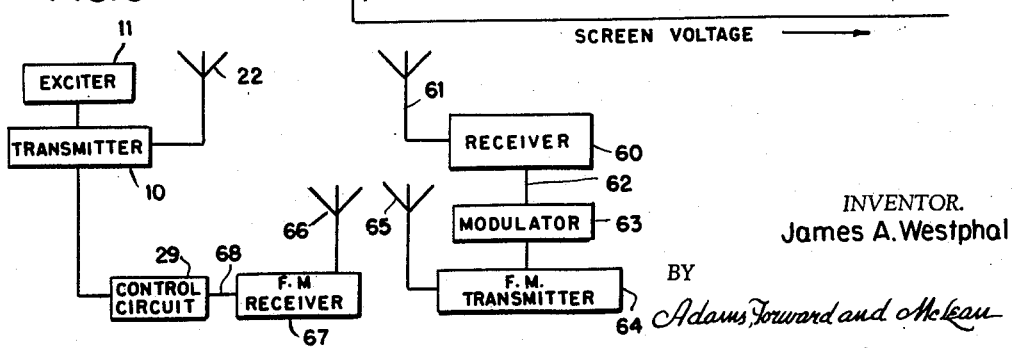
Figure 3 is a diagram illustrating another arrangement in accordance with my invention.

Referring to Figure 3, exciter 11 is shown connected to transmitter 10 which is in turn connected to antenna 22 in the same arrangement as shown in Figure 1.

A receiver 60 is employed which is tuned to the frequency of the wave radiated by antenna 22. Receiver 60 suitably employs an antenna 61 in place of coil 30 to sense the radiated wave, and detects the received signal to produce an output voltage which is a function of the variations in peak to peak amplitude of the signal received at antenna 61.

The detected output of receiver 60 is connected by line 62 to drive the modulator 63 of a frequency modulated transmitter 64 tuned to a carrier frequency different than the frequency transmitted at antenna 22. The frequency modulated output of transmitter 64 is radiated by an antenna 65 and received by antenna 66 and FM receiver 67 located conveniently adjacent to transmitter 10. FM receiver 67 in a conventional manner demodulates the received FM signal from transmitter 64, and produces a demodulated output signal which, therefore, will be a function of the intensity of the field at antenna 61 of the electromagnetic wave radiated by antenna 22.

The demodulated output of FM receiver 67 is connected by line 68 to output control circuit 29; thus control of the output power of transmitter 10 is based on the field intensity of the wave radiated by antenna 22 at the location of antenna 61 in exactly the same manner as described with reference to Figure 1.

Alternatively, in place of frequency modulation of transmitter 64 and receiver 67 the detected output of receiver 60 can be used to phase, pulse width, pulse space, or pulse length modulate transmitter 64. Such forms of modulates the received FM signal from transmitter provide a demodulated output which is unaffected by variations in the power output level of transmitter 64, and, accordingly, the power output level of transmitter 64 is not involved in the control loop.

It will also be evident that although I have described a particular output control circuit with reference to Figure 1 and the employment of a power tetrode 12 in transmitter 10, circuit 29 can be altered suitably to provide control of triodes as power amplifier tubes by controlling the bias of the triode control grids such that when the intensity of the field at coil 30 increases, the triode control grid is made more negative to reduce amplification in the triode. Evidently, also, tetrode 12 can be controlled by controlling the bias of control grid 16, although this is less convenient than the arrangement described in Figure 1. Pentodes, although commercially not employed as power amplifier tubes, might similarly be controlled.

I claim:

In combination with a radio transmitting apparatus including an amplifier for a high frequency electrical signal having an output circuit and a control circuit, the amplitude of a signal of said high frequency in said output circuit being a function of an input control signal applied to said control circuit, and an antenna coupled to said output circuit for generating an electromagnetic wave of said high frequency; the improvement which includes electromagnetic field sensitive means for positioning in the field of said electromagnetic wave, said field sensitive means having an output circuit for generating an output control signal in said output circuit of said field sensitive means which is a function of the intensity of an electromagnetic field of said high frequency at the position of said field sensitive means, in which said amplifier includes a first electron amplifier tube coupled to said output circuit of said amplifier and having a space current control electrode, in which said control circuit includes a second and a third electron amplifier tube, each having a cathode, a space current control electrode and an anode, said control electrode of said first tube being connected in series with said anode and cathode of said second tube to a source of bias potential, said anode of said third tube being connected to said control electrode of said second tube, means having a fixed impedance connecting said cathode of said third tube to a source of bias potential, means having a fixed potential connected to said cathode of said third tube, and means coupling said output circuit of said field sensitive means across said control electrode and cathode of said third tube of said control circuit as an input control signal for said amplifier, whereby the amplitude of said high frequency signal coupled to said antenna is a function of the field intensity of said wave at the location of said field sensitive means.

References Cited in the file of this patent

UNITED STATES PATENTS

| | | |
|---|---|---|
| 2,085,125 | Shaw | June 29, 1937 |
| 2,678,998 | Young | May 18, 1954 |